UNITED STATES PATENT OFFICE.

JOHN A. DUFFY, OF CHICAGO, ILLINOIS.

DUST COLLECTING AND ABSORBING SUBSTANCE.

No. 913,476.           Specification of Letters Patent.           Patented Feb. 23, 1909.

Application filed August 26, 1908. Serial No. 450,289.

*To all whom it may concern:*

Be it known that I, JOHN A. DUFFY, a citizen of the United States, residing at Chicago, in the county of Cook and State of Illinois, have invented certain new and useful Improvements in Dust Collecting and Absorbing Substances, of which the following is a specification.

This improved dust collecting and absorbing substance is primarily adapted for collecting dust, dirt and other impurities found upon floors, tiling, linoleum, rugs, carpets, etc., the same serving as an antiseptic or germicide.

My invention relates to a mineral wax and which I use to form a covering and binder for a base (composed preferably of salt, sawdust and sand, although other dry granular substances can be employed), which, when covered perfectly with the above referred to wax, forms a valuable sweeping and cleaning preparation that can be passed or drawn over the floor surface without agitating dust, dirt and lint found on same and causing the dust to rise and float in the air; but the sticky wax surface gathers and immediately absorbs all of the dust, dirt and lint. Another great improvement or advantage it has over any other material ever employed for a similar purpose is its non-volatile sticky nature which will not dry out with age and will not grease or stain the floor surface, even if it is allowed to remain on same for months. This cannot be said of any other material that has been used for a similar purpose.

Any kind of paper or fiber sack or container can be used for packing the finished product as it will not spot or stain, thus effecting a great saving in the cost of the container used for packing.

The filler or covering matter in this instance is obtained from the tailings of mineral oil after the inflammable gases and volatile liquid hydrocarbon compounds of the paraffin series have been first driven off, thus leaving a sticky non-oily wax-like substance that is impervious to atmospheric and weather conditions.

A suitable color can, if desired, be added to the filler or covering matter after the same has been heated, so as to convert it into a liquid preparatory to depositing it with the base. This coloring may be of burnt umber or any mineral pigment or anilin color, and when poured or deposited upon the base serves to give the resultant product both an attractive and uniform appearance.

The various ingredients of the base are thoroughly agitated and mixed in a revolving mixer or chamber, so as to convert it into a uniform compound. The non-oily filler or covering matter is then warmed by means of steam coils or otherwise, so as to convert it into a liquid, in which condition it is poured into the mixing chamber upon the basic materials with which it is thoroughly impregnated, so that the various basic particles are thoroughly coated or covered with the non-oily wax-like substance, which forms the filler or covering. After the basic particles have been thoroughly coated or covered with the aforesaid non-oily wax-like covering a suitable antiseptic and deodorant, is poured into the revoluble mixer just before removing the finished product from the mixing chamber. The resultant product possesses the qualities of collecting and absorbing dust, dirt and other impurities, and, owing to its antiseptic properties, is especially useful for sanitary purposes, leaving the premises in a clean and healthful condition.

Oil of mirbane, or any other similar essential oil, can be employed as a deodorant in combination with this improved dust collecting and absorbing substance.

What I claim as new and desire to secure by Letters Patent is:

A dust collecting and absorbing substance having a base capable of retaining a non-volatile permanent covering, and non-greasy tailings of mineral oil, forming a permanent covering therefor, substantially as described.

JOHN A. DUFFY.

Witnesses:
    WALKER BANNING,
    PIERSON W. BANNING.